United States Patent [19]

Bard et al.

[11] Patent Number: 5,382,336
[45] Date of Patent: Jan. 17, 1995

[54] TIP POSITION MODULATION AND LOCK-IN DETECTION IN SCANNING ELECTROCHEMICAL MICROSCOPY

[75] Inventors: Allen J. Bard, Austin, Tex.; David O. Wipf, Starkville, Miss.

[73] Assignee: Board of Regents, The University of Texas System, Austin, Tex.

[21] Appl. No.: 869,301

[22] Filed: Apr. 16, 1992

[51] Int. Cl.⁶ .......................................... G01N 27/26
[52] U.S. Cl. ................................................ 204/153.1
[58] Field of Search ............................. 204/153.1, 400

[56] References Cited

U.S. PATENT DOCUMENTS 4,747,698  5/1988  Wickramasinghe et al. ........... 374/6

OTHER PUBLICATIONS

Bard, et al., "Chemical Imaging of Surfaces with the Scanning Electrochemical Microscope", Science, 254:68–74, (1991), Publ. Washington, D.C. no month available.
Bard, et al., "Scanning Electrochemical Microscopy: A New Technique for the Characterization and Modification of Surfaces", Acc. Chem. Res., 23:357–363, (1990), Publ. Washington, D.C. no month available.
Engstrom, et al., "Scanning Electochemical Microscopy", Anal. Chem., 61(19):1099A–1104A, (1989), Publ. Washington, D.C. no month available.
Wipf, et al., "Scanning Electrochemical Microscopy", J. Electrochem. Soc., 138(5):L4–L6, (1991), Publ. Pennington, N.J. no month available.
Wipf, et al., "Scanning Electrochemical Microscopy", J. Electochem. Soc., 138(2):469–474, (1991), Publ. Pennington, N.J. no month available.
Lee, et al., "Scanning Electrochemical Microscopy: Preparation of Submicrometer Electrodes", Anal. Chem., 63:78–83, (1991), Publ. Washington, D.C. no month available.

Kwak, et al., "Scanning Electochemical Microscopy. Theory of the Feedback Mode", Anal. Chem., 61:1221–1227, (1989), Publ. Washington, D.C. no month available.
Hieftje, G. M., "Signal-to-Noise Enhancement Through Instrumental Techniques", Anal. Chem., 44(6):81A–88A, (1972), Publ. Washington, D.C. no month available.
Kwak, et al., "Scanning Electrochemical Microscopy. Apparatus and Two-Dimensional Scans of Conductive and Insulating Substrates", Anal. Chem. 61:1794–1799, (1989), Publ. Washington, D.C. no month available.
Bard, et al., "Scanning Electrochemical Microscopy: Theory and Application of the Transient (Chronoamperometric) SECM Response", Anal. Chem., 63:1282–1288, (1991), Publ. Washington, D.C. no month available.

(List continued on next page.)

Primary Examiner—John Niebling
Assistant Examiner—Bruce F. Bell
Attorney, Agent, or Firm—Arnold, White & Durkee

[57] ABSTRACT

Small amplitude tip-position modulation (TPM) in combination with lock-in detection of the modulated current signal is applied to a scanning electrochemical microscope (SECM) to improve signal-to-noise ratio and to enhance image resolution. Phase shift information from the alternating current TPM signal and the bipolar response of TPM over insulators and conductors make TPM-SECM superior to conventional SECM imaging methods as well as useful for measuring substrate conductivity.

9 Claims, 12 Drawing Sheets
(2 of 12 Drawing(s) in Color)

OTHER PUBLICATIONS

Unwin, et al., "Scanning Electrochemical Microscopy. Theory and Application of the Feedback Mode to the Measurement of Following Chemical Reaction Rates in Electrode Processes", J. Phys. Chem., 95:7814–7824, (1991), Publ. Washington, D.C. no month available.

Lee, et al., "Scanning Electrochemical Microscopy. Improvement of Image Resolution by Digital Processing Techniques", Anal. Chem., 63:2442–2447, (1991), Publ. Washington, D.C. no month available.

Binnig, et al., "Scanning Tunneling Microscopy", Helv. Phys. Acta, 55:726–735, (1982), Publ. Basel, Switzerland no month available.

Pashley, et al., "Scanning Tunnelling Microscope Studies", Surf. Sci., 152/153:27–32, (1985), Publ. Amsterdam, Netherlands no month available.

Binnig, et al., "Scanning Tunneling Microscopy", Surf. Sci., 126:236–244, (1983), Publ. Amsterdam, Netherlands no month available.

Wipf, et al., "Tip–Modulated Scanning Electrochemical Microscopy", Pittcon '92, (Book of Abstracts 944), (1992), Publ. New Orleans, La. no month available.

TIP POSITION MODULATION AND LOCK-IN DETECTION IN SCANNING ELECTROCHEMICAL MICROSCOPY

BACKGROUND OF THE INVENTION

Because of government agency support furnished to the inventors, the government has certain rights in the invention.

ABBREVIATIONS a' radius of the ultramicroelectrode conductor (tip radius)
AC alternating current
d' average tip-to-substrate distance
DC direct current
δ tip position modulation distance
$E^{o'}$ formal potential
$E_s$ substrate potential
ET electron transfer
$f_m$ tip position modulation frequency
GC glassy-carbon
IDA interdigitated array
$i_T$ tip current during imaging
$i_{T,\infty}$ tip current when tip is far from substrate
$k_f$ heterogeneous rate of electron transfer
RG ratio of the radius of the tip insulating sheath to the radius of the central tip conductor
rms root mean square
SECM scanning electrochemical microscope
STM scanning tunneling microscope
$\Theta_i$ phase of the tip current with respect to tip motion
TPM tip-position modulation
UME ultramicroelectrode
V volts

FIELD OF THE INVENTION

The invention relates to methods and apparatii to improve the resolution of images produced by a scanning electrochemical microscope (SECM), especially in constant current imaging of surfaces with both conductive and nonconductive (insulating) areas. Additionally, the methods described can be applied to improve the signal-to-noise ratio of an SECM and to characterize the conductivity of any point on a scanned surface.

SECM PRINCIPLES

In an SECM, a scanning tip and a sample substrate to be scanned are immersed in the solution of an electrochemical cell containing an electroactive species or mediator, e.g., $Fe(CN)_6^{3-}$, $Fe_2(SO_4)_3 \cdot 3H_2O$, $Ru(NH_3)_6Cl_3$, or methyl viologen dication. A specific mediator is chosen for each SECM application to be capable of undergoing oxidation and reduction under required cell conditions, and cell potentials are in turn chosen to be sufficiently negative or positive so that the desired oxidation or reduction reactions take place at the scanning tip and (if applicable) at the substrate.

The tip constitutes one electrode in the cell; reference and auxiliary electrodes are also included. The mediator is oxidized or reduced in the immediate vicinity of the tip. The sample substrate, if it is a conductor or semiconductor, can also be connected as an electrode in the cell, although frequently it is not. Insulators, including mineral and biological samples, are not part of the electrochemical cell circuit and are simply positioned beneath the tip.

The scanning tip is an ultramicroelectrode (UME), viz., a conductive disk, frequently Pt, with a diameter of 10 nm to 25 μm; it is imbedded in an insulating sheath. In one mode of operation, the potential of the UME disk is adjusted by an external circuit to be sufficiently negative or positive with respect to the reference electrode so that the mediator is reduced at the disc surface. The resulting current flow, $i_T$, is characterized by transient and steady-state portions. When the UME is more than about five disc diameters from the substrate, the steady-state current, called $i_{T,\infty}$, is governed by the mass transfer (flux) of the electroactive species to the UME disk.

In another mode of operation, a UME is scanned across a substrate of uniform conductivity, being held a substantially constant distance from a reference plane and also being held within a distance of approximately 1/10th to two disc diameters of the substrate surface. Measured changes in UME disk current are then proportional to changes in the perpendicular distance separating the disk from the surface. Thus, measurements of the disk currents on repetitive, closely-spaced scans parallel to the reference plane may be used to produce a topographic representation of the scanned substrate.

Analogously, a direct or alternating voltage may be applied between the UME and the substrate or auxiliary electrode during scanning of the substrate. Proper choice of mediator and applied voltages allow one to use measured currents and phase angles (where applicable) to draw conclusions regarding the electrochemical nature of scanned regions of the substrate.

Contrast SECM and Scanning Tunneling Microscopy (STM)

SECM and STM instruments are similar in construction but materially different in operation. For example, the UME current in an SECM differs from that of an STM because the tip-substrate distance in an STM is about one nanometer or less, whereas in an SECM it is from about 1/10th to two tip diameters (with typical tip diameters of 10 nm to 25 μm). As a result of the close tip-substrate spacing in an STM, the UME current is tunneling (nonfaradaic), whereas the analogous current in an SECM is faradaic (i.e., causing chemical changes in the solution bathing tip and substrate). Studies of the flow of faradaic UME currents concern redox potentials and chemical kinetics, while the primary factor affecting flow of tunneling current in an STM is the effective tunneling barrier height.

Barrier Height Spectroscopy in STM

In conventional tunneling spectroscopy, tunneling current is measured as a function of the applied voltage, providing a measure of the sample density of states. One of the major uncertainties in such experiments is that the effective height and width of the tunneling barrier are generally unknown. However, it is possible to directly probe the effective tunneling barrier height. Thus, although barrier height spectroscopy has received comparatively little attention, it provides information complementary to tunneling spectroscopy.

Barrier height spectroscopy involves measuring the dependence of the tunneling current on the sample-tip separation at constant applied voltage. In its usual implementation, a constant bias is applied between the sample and tip. A small modulation (typically a few hundredths of an Angstrom) is applied by the Z-piezo, and the resulting modulation in the tunneling current is measured using a lock-in amplifier (14, 15). Note, however, there is no commonly accepted analysis of phase relationships between tunneling current waveforms and UME modulation. Further, barrier height spectroscopy in STM is not associated with the positive and negative feedback characteristics of SECM current measurements. Thus, the claimed invention's incorporation of information from both phase relationships and feedback phenomena differentiates it from both barrier height spectroscopy and conventional SECM operations.

Feedback in SECM current measurements

Feedback is the chemical communication that may be induced between a substrate surface and a UME. In a feedback mode, the UME is held at a potential where electrolysis of the mediator is diffusion-controlled. The relationship of steady-state UME currents $i_T$ and $i_{T,\infty}$ depends on whether the scanned surface is conductive or an insulator. Information about the conductive/insulating nature of the substrate may be obtained by measurement of disk currents when the UME is within a few disk diameters of the substrate, that is, within imaging distance. If the substrate is conductive, a condition called positive feedback occurs ($i_T > i_{T,\infty}$); an insulating substrate, in contrast, results in negative feedback ($i_T < i_{T,\infty}$). Note that for substrates which catalyze oxidation or reduction reactions, the overall negative feedback response resulting from an enzyme reaction may be larger than that seen over a pure insulator. Note also that if the tip is so close to the substrate as to allow a tunneling current to flow, the SECM response as described above will not occur.

Steady-state comparisons between $i_T$ and $i_{T,\infty}$ to determine feedback may be confounded during a scan because one cannot distinguish between a change in $i_T$ caused by a topographic change in the substrate (i.e., an increase or decrease in disk/substrate distance) and a change in $i_T$ caused by scanning movement of the disk over regions of differing conductivity.

Notwithstanding this ambiguity, the chemical specificity obtained through use of appropriate mediators allows use of an SECM to image variations in chemical, electrochemical, and enzyme activity (reaction-rate imaging) at resolutions of better than 1 $\mu$m (1,4–5). Image resolution is improved with smaller tips and, under ideal conditions, tips of 0.1 $\mu$m radius and smaller have been used for SECM (6). Using smaller tips, however, leads to experimental difficulty because of signal-to-noise reduction caused by the smaller imaging current. In addition, the SECM imaging signal is less than ideal since it appears with a large direct current (DC) offset, i.e., $i_{T,\infty}$ (7).

SUMMARY OF THE INVENTION

The problems in SECM of distinguishing topographic effects (surface unevenness) from changes in substrate conductivity, as well as those of extracting an SECM imaging signal from a large DC offset, are effectively reduced by the presently claimed invention. Called tip-position modulation or TPM, the invention comprises processes and apparatii which in preferred embodiments are combined with and significantly augment the discernment of a conventional SECM.

TPM techniques and principles

The TPM SECM technique enhances image resolution and provides information on conductivity of the substrate because the modulation process shifts the signal from DC to the modulation frequency, making it an alternating current (AC) signal. Thus, the DC offset and associated low-frequency noise sources (i.e., drift) can be easily removed from the AC signal so as to improve the signal-to-noise ratio (8). In addition, use of phase-sensitive lock-in amplification to measure the AC signal reduces noise further by limiting the measurement bandwidth. TPM SECM produces images superior to simple feedback SECM.

Principles of TPM are shown schematically in FIG. 1A. The tip is moved through planned motions of small amplitude along the z-axis, preferably in a pattern of simple harmonic motion (sinusoidally). Thus, the preferred tip-to-substrate distance is modulated by $\pm \delta/2 \sin 2\pi f_m t$ about its average value $d'$. This movement causes a modulation in the tip current at the same frequency, as shown in FIG. 1B. Since a positive change in z (movement away from the surface) causes a decrease in the tip current over a conductor but an increase over an insulator, $i_T$ (conductor) and $i_T$ (insulator) are 180° out-of-phase. Thus, by detecting the in-phase component of the modulated current (in-phase with the sinusoidal waveform describing tip motion) with a lock-in amplifier, one can identify the conductive or nonconductive nature of the surface, as well as take advantage of the noise reduction available in this mode of detection.

Mathematical modeling and performance

As an aid to analysis, the in-phase TPM response at conducting surfaces can be modeled simply as the derivative of the steady-state DC behavior; the response at insulating surfaces is more complex. The bipolar TPM response for insulating and conducting surfaces, together with the increased sensitivity of the signal to tip-substrate proximity, allow more accurate mapping of the surface. When modifications desired to augment a DC (conventional) SECM with TPM capability are accomplished, the modified instrument gains the capability to acquire DC and TPM data simultaneously.

The best resolution previously reported with the SECM technique was with a tip having a 0.1 $\mu$m radius (6), but more recent work has used tips with 0.03 to 0.05 $\mu$m radius. To improve the resolution further requires use of smaller tips in a constant current feedback mode, such as that used by the scanning tunneling microscope (STM), to maintain a close tip-substrate proximity (13). Preliminary work has demonstrated that smaller tips and constant-current imaging are possible with SECM. But for surfaces containing both insulating and conducting regions, constant-current imaging was difficult to accomplish prior to the present invention. This is because the feedback controller in a constant-current mode requires information about the nature of the surface.

Such information is contained in the TPM signal of the claimed invention, which can give an unambiguous indication of whether a surface is insulating or conducting. Thus, $\Theta_i$ or the phase of UME current, in combination with the DC signal, can be used to provide constant-current imaging of mixed insulating and conducting substrate surfaces.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DESCRIPTION OF THE PREFERRED EMBODIMENTS

Elements of TPM Methods and Apparatus

Figure 1A:
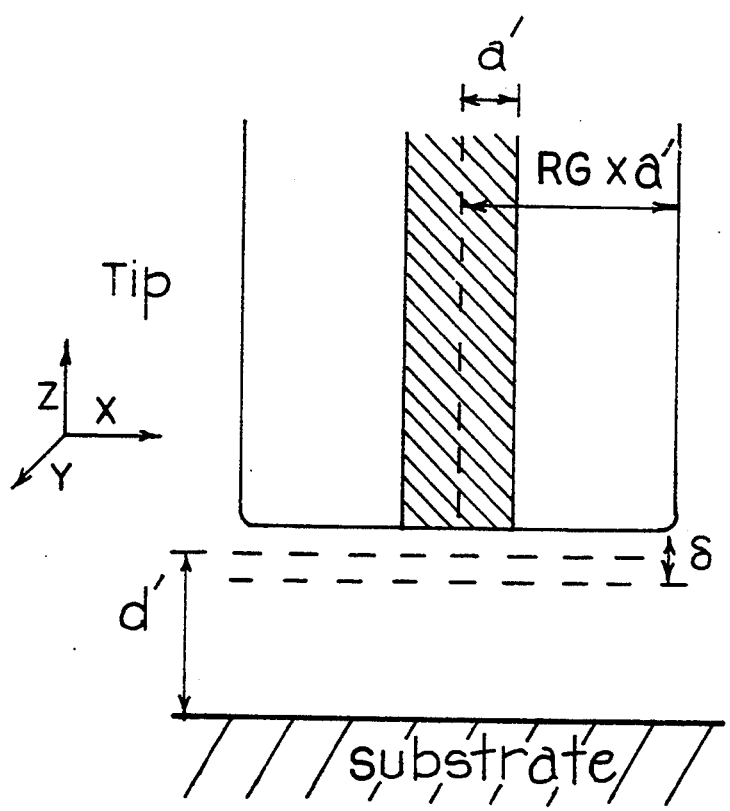
FIG. 1A Schematic diagram of the TPM experiment.
Figure 1B:
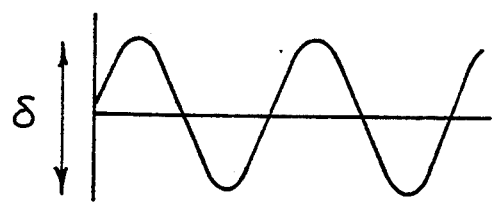
FIG. 1B Idealized representation of the tip position and currents observed over insulating and conducting substrates with time FIG. 2 Block diagram of the TPM SECM FIG. 3 Experimental and theoretical SECM and TPM SECM current vs. distance plots with a conductive gold substrate. The small deviation in the experimental data at $d'/a'=0.5$ is an artifact due to the clamping action of the coarse piezo positioners.
Figure 1B:
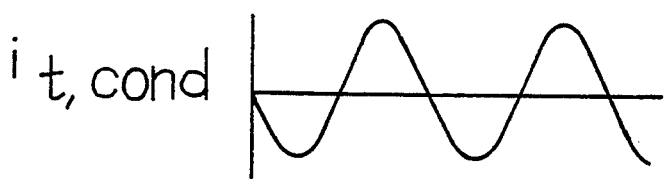
Figure 1B:
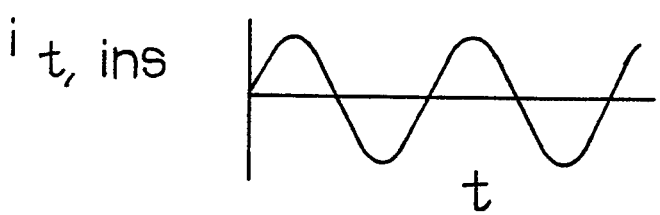

TPM substantially improves the sensitivity of conventional SECM's to insulating substrates (or insulating portions of conducting substrates), in part because its bipolar response over both insulating and conducting surfaces results in improved noise rejection. In recognition of these advantages, preferred embodiments of the presently claimed invention include a method for characterizing a point on a substrate surface or the entire surface. An appropriately modified SECM which implements TPM is also claimed.

The claimed method comprises immersing a substrate surface in an electrolyte solution containing a mediator capable of undergoing redox reactions. Additionally, an electrical potential is established between a reference electrode and a UME in communication with the surface through the solution. Communication is through the medium of redox reactions taking place in the solution at the UME tip and, in some embodiments, at the substrate surface.

A preferred embodiment of the instant invention is a modified SECM for improved imaging of surfaces with conducting and insulating regions. Such an improved SECM comprises a means for establishing an electrical potential between a reference electrode and a UME, the UME being in communication (as above) with a substrate surface through an electrolyte solution comprising a mediator. Means are also provided for measuring electrical current in the UME in relation to varying distance separating the UME from the surface as the UME is scanned over the surface. Preferred embodiments of the TPM SECM also include means to vary the distance separating the UME from the surface according to a planned pattern, as well as means to relate planned variations in distance to changes in current, and to relate changes in substrate-mediator redox reaction rate to changes in current and planned variation in distance.

Tip Current as a Function of Tip-Substrate Distance and Substrate Conductivity

In any preferred embodiment of the instant invention, the tip-substrate distance is varied according to a plan; such variation may be continuous or discrete, and in preferred embodiments is sinusoidal. The UME tip may be either placed adjacent to selected locations on the surface or scanned over the surface according to a predetermined pattern. Scanning motion is in a plane nominally parallel to the surface being scanned; such motion may be continuous or discrete, and may incorporate oscillation of the UME tip in the scanning plane as a means to more clearly define boundary regions where surface properties change materially.

If the distance from UME tip to substrate surface is less than about 5 tip diameters (preferably less than about 2 tip diameters), tip current in a constant-distance scanning mode varies with changes in surface conductivity. For example, scanning from a conductive region to an insulating region at a constant distance would cause tip current to decrease.

In addition to changes in tip current due to changes in conductivity of the scanned substrate, tip current also varies at the frequency at which the tip-substrate distance is changed. Such variation may be either in-phase with tip motion perpendicular to the substrate surface or 180° out-of-phase with the motion. This relationship stems from the fact that tip current decreases with increasing distance when the surface is a conductor and increases with increasing distance when the surface is an insulator. If the distance is varied in a sinusoidal manner at frequency $f_m$, an AC current of the same frequency will flow in the UME in addition to the DC current that would flow if the distance were not being varied.

Parameters of Preferred Embodiments

In preferred embodiments of the instant invention, a conducting substrate is preferably sufficiently positive with respect to the mediator redox potential so that the substrate reaction below the tip is diffusion limited. The distance separating the UME from the surface is preferably varied sinusoidally to produce simple harmonic motion of the UME with respect to the surface, and the simple harmonic motion has a preferred frequency between about 20 Hz and about 20,000 Hz. The distance separating the UME from the surface may also be altered discretely.

In each embodiment, the UME conductor disk has radius $a'$ and moves in simple harmonic motion through distance $\delta$ perpendicular to the surface at an average distance of about $d'$ from the surface. Preferably, $a'$ is between about 0.01 and 25 μm, $d' >$ about $2.5\delta$, and $\delta/a'$ is between about 0.01 and 1.0. Possible mediators include $Ru(NH_3)_6Cl_3$, $Fe(CN)_6^{3-}$, $Fe_2(SO_4)_3 \cdot 3H_2O$, or methyl viologen dication, and mediator concentration is generally preferred in the range of about 0.1 mM to 2.0M. A particularly preferred mediator is $Ru(NH_3)_6Cl_3$ in a concentration of about 1.5 to 2.0 mM. The electrolyte solution comprises phosphate citrate buffer at pH about 4.0, made to about 0.5M ionic strength with KCl.

Finally, regarding the TPM-SECM embodiment of the instant invention, the preferred means for measuring electrical current in the UME, and for relating planned variations in UME-to-substrate distance to changes in current, comprise primarily analog or primarily digital circuits, or a combination of analog and digital circuits with necessary converters. One preferred embodiment for measuring UME current comprises a potentiostat, current-to-voltage converter, and digital computer. A preferred means to relate changes in substrate conductivity to changes in current and distance comprises a potentiostat, current-to-voltage converter, filter, lock-in amplifier and digital computer. A preferred means to continuously vary the distance separating the UME from the surface comprises a potentiostat, current-to-voltage converter, filter, lock-in amplifier, digital computer, high voltage piezo driver, and piezo pusher.

The following examples are presented to describe preferred embodiments and utilities of the present invention, and are not meant to limit the invention unless otherwise stated in the claims appended hereto. Taken together, the examples illustrate representative demonstrations of the best mode of implementing the invention as currently understood.

EXAMPLES

Apparatus

Figure 2:
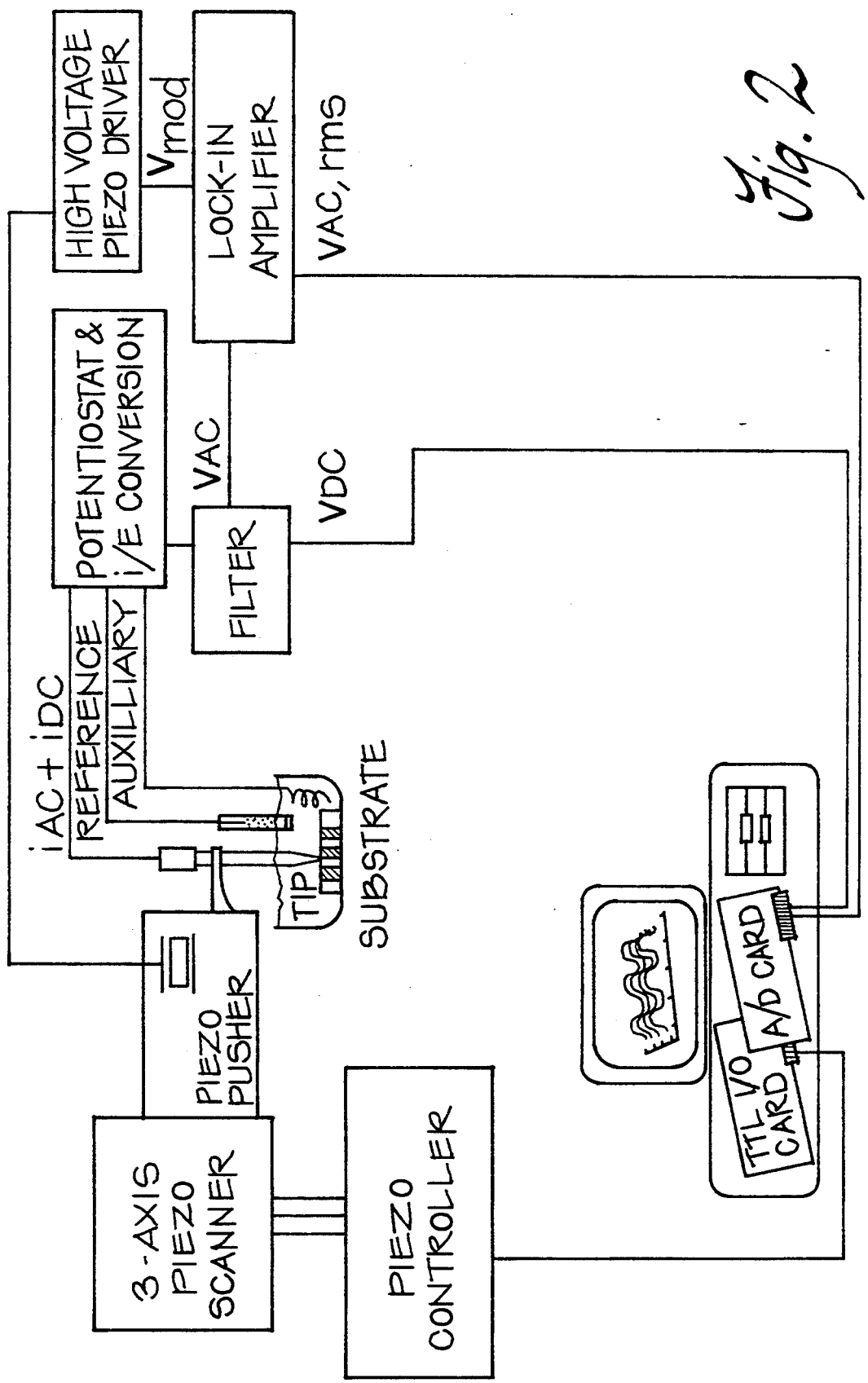

The apparatus for TPM SECM experiments is similar to that described previously by the present inventors (5), and is shown schematically in FIG. 2. It comprises an electrolyte bath in which a scanning UME, a reference electrode, and the substrate to be scanned are immersed. A three-axis scanner is provided to move the UME over the substrate surface, keeping it close to the surface but not touching it. Added to these basic components of an SECM are several additional pieces needed to perform the TPM function.

Modulation of the tip position required by TPM is achieved by mounting the tip on a spring loaded linear translation stage (Model 421-OMA, Newport Corp., Fountain Valley, Calif.) driven by a piezoelectric pusher (PZT-30, Burleigh Instruments, Inc., Fishers, N.Y.) with a nominal displacement of 5 nm/V. The modulation voltage, $V_m$, for the pusher is derived from the sine-wave reference oscillator output of a lock-in amplifier (Model 5206 or 5210 two-phase lock-in amplifier, EG&G PAR, Princeton, N.J.) and amplified to the desired value by a high-voltage DC amplifier (PZ-70, Burleigh Instruments).

Conditions

For the experiments described herein, the SECM response is assumed to be solely limited by diffusion control (5). The conductive substrates are not necessarily externally biased, but the substrate potential is preferably sufficiently positive with respect to the mediator redox potential that the substrate reaction below the tip is diffusion limited. The TPM SECM experiments are similar to conventional SECM experiments, except that the tip current is composed of a combination of the normal DC component plus an AC component induced by the piezo motion. The DC response is measured after current-to-voltage conversion and filtering at 15 Hz to remove the AC component (FIG. 2). The modulation signal is then measured with the lock-in amplifier to generate the phase-resolved rms AC response. For all the experiments, the DC and AC signals are acquired simultaneously so that the data can be directly compared. Other details concerning tip positioning and scanning have been described earlier (9).

Reagents $Fe_2(SO_4)_3$ (Puratronic, Alfa, West Hill, Mass.) and $Ru(NH_3)_6Cl_3$ (Strem Chemicals, Newburyport, Mass.) are used as received. Electrolyte solutions are 1M sulfuric acid in deionized water (Milli-Q, Millipore) or phosphate-citrate (McIlvaine) buffers made to 0.5M ionic strength with KCl.

Electrodes

Ultramicroelectrode tips are prepared as described previously (5). Substrates are a 3.0 mm diameter glassy-carbon (GC) disk (BAS, W.Lafayette, Ind.), evaporated gold (200 nm Au on 10 nm Cr on glass), an interdigitated electrode array (IDA, 3 μm wide Pt bands separated by 5 μm wide $SiO_2$ insulators), and glass microscope slides. Both the GC substrate and tip electrodes are polished with 0.05 μm alumina on felt (Buehler, Ltd., Lake Bluff, Ill.) before each experimental run. No other electrode pretreatment is applied. The other substrates are used after an ethanol and distilled water rinse. Potentials are recorded versus a $Hg/Hg_2SO_4$ reference electrode in 1M sulfuric acid (MSE), a Ag/AgCl reference eletrode in 3M KCl, or a Ag wire QRE. All potentials are reported versus the formal potential of the mediator couple used in the experiment. The auxiliary electrode is Pt gauze or wire.

Example 1

SECM and TPM SECM Current vs. Distance Plots

TPM at conducting substrates

Figure 3A:
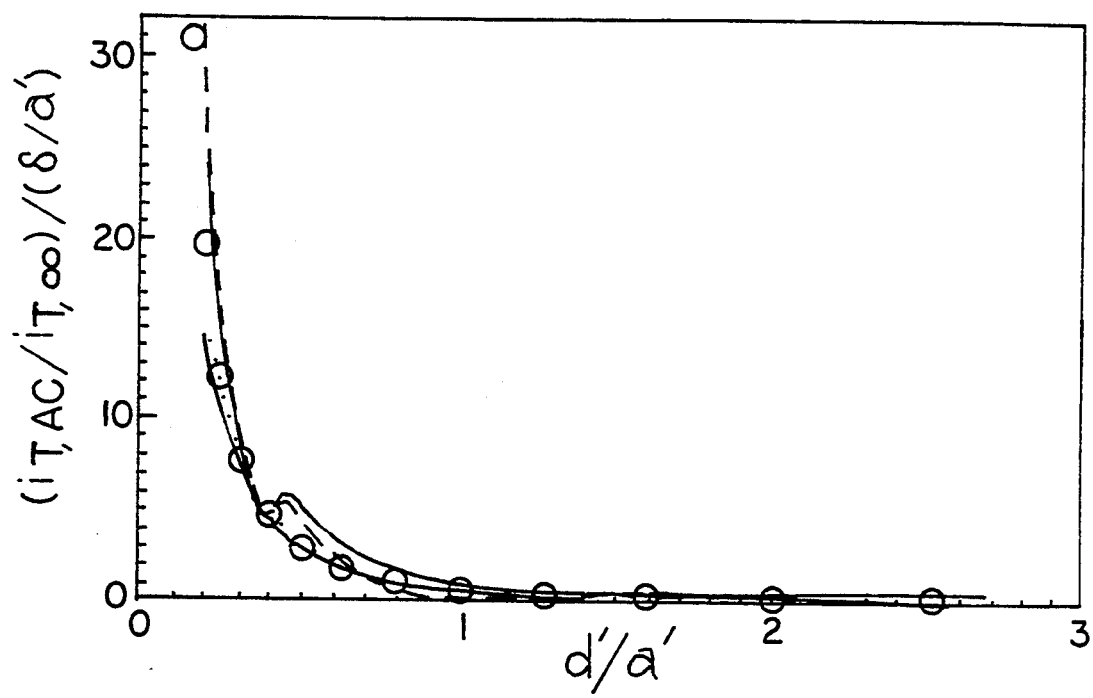
Figure 3B:
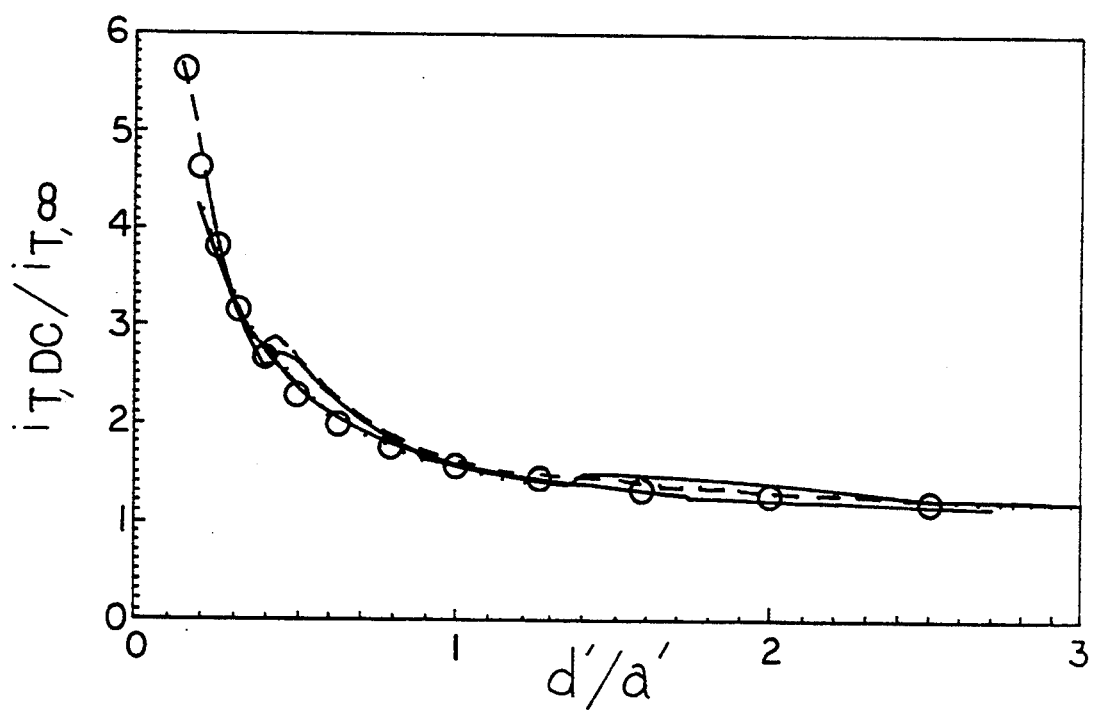

Experimental in-phase TPM and DC SECM responses versus tip-substrate separation, d' at a conductive substrate are shown in FIG. 3A and 3B. These data represent various values of the peak-to-peak tip-distance modulation, δ; electrode radius, a'; and modulation frequency, $f_m$. The distance axis is normalized by dividing d' by the radius to give d'/a'. The tip current $i_{T,DC}$ for the DC response in FIG. 3B is normalized by the $i_T$ value measured at a large d' value, $i_{T,\infty}$. The rms in-phase modulated tip current, $i_{T,AC}$, is normalized by division by $i_{T,\infty}$ and by the ratio of $\delta_{rms}/a'$, where $\delta_{rms}$ is the rms value of the peak-to-peak modulation distance.

For sufficiently small δ, the in-phase TPM signal can be considered to be the derivative of the DC conductor response. A good approximation of the theoretical DC current-distance response is given by equation 1.

$$i_{T,DC}/i_{T,\infty} = 0.68 + 0.78377/L + 0.33\text{-}15exp(-1.0672/L) \quad (1)$$

where L=d'/a'. The derivative is equation 2

$$d(i_{T,DC}/i_{T,\infty})/dL = (-0.78377 + 0.35\text{-}38exp(-1.0672/L))/L^2 \quad (2)$$

The experimental DC data can be fit to equation 1 to determine $i_{T,\infty}$ and the absolute tip-substrate distance for the TPM experiment (FIG. 3B). This allows the experimental TPM data to be compared to equation 2 with no adjustable parameters; the agreement is excellent. Note that the derivative has been inverted to match the polarity of the experimental data.

The tip-modulation frequency in these experiments is limited to a small range. However, FIG. 3 shows that data taken at $f_m$ values of 40 and 100 Hz are essentially identical. The lower limit for modulation frequency is governed by the time scale of the experiment. Frequencies lower than 20 Hz require measurement times too long to be usable in an imaging experiment and would also interfere with the DC signal.

The effect of the tip-modulation distance, $\delta$, was investigated by varying the dimensionless ratio of $\delta/a'$ over a range of 0.01 to 1.0. Over this range, the TPM signal was directly proportional to this ratio. However, large $\delta/a'$ values lead to experimental difficulties. The closest approach of the tip to the substrate surface is $\delta/2$, limiting sensitivity. A further difficulty is that, at sufficiently large $\delta/a'$ values, the DC signal is perturbed by the tip modulation. Because the tip current is not a linear function of distance (equation 1), the distance modulation signal is rectified to supply an additional DC current. This is analogous to faradaic rectification found in electrochemical experiments when an AC modulation is applied under conditions where the i-E characteristic is nonlinear. This effect can be calculated by integrating the modulation current over a modulation cycle. The calculation shows that, for sinusoidal modulation, the DC current is roughly 10% larger than expected when the ratio of $\delta/a'$ is greater than $0.4d'/a'$. Thus, as a rule of thumb, only $d'$ values greater than 2.5 $\delta$ should be used.

Comparison of the TPM and DC signals shows that there are a number of advantages in the use of the TPM signal. Some of those advantages are as follows. One is that the TPM signal has an absolute baseline of zero at large $d'$, in contrast to the baseline of $i_{T,\infty}$ for the DC data. Also the TPM signal is more sensitive to $d'$ at close distances. Both of these characteristics tend to make the TPM signal a more precise and accurate signal for imaging with the SECM.

TPM at Insulating Substrates

Figure 4A:
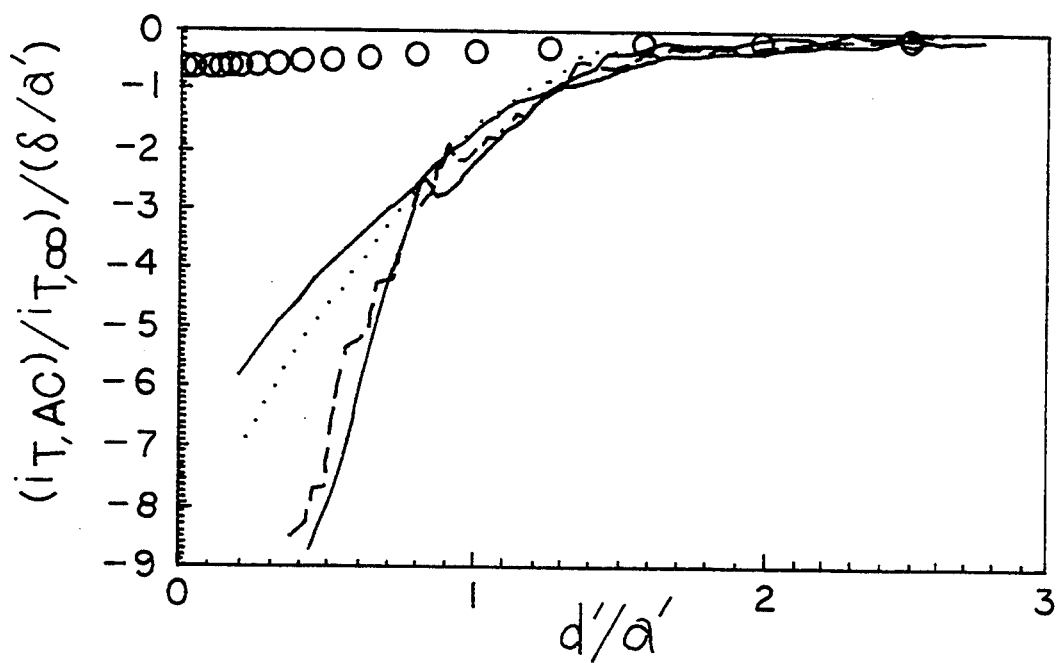
FIG. 4A and 4B Experimental and theoretical SECM and TPM SECM current vs. distance plots with an insulating glass substrate.
Figure 4B:
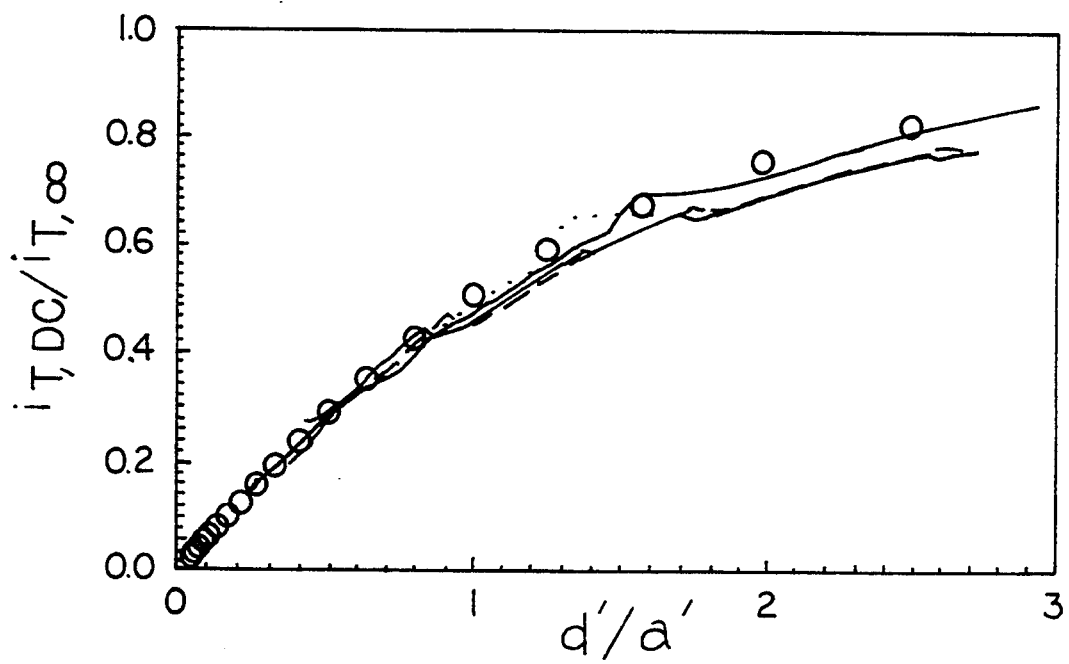

Experimental in-phase TPM and DC SECM response versus tip-substrate separation, $d'$, at an insulating substrate are shown in FIGS. 4A and 4B. These data were acquired for various values of tip-modulation distance, $\delta$, electrode radius, $a'$, and modulation frequency, $f_m$. As for the conductor case, the TPM and DC signals were acquired simultaneously and are shown in the same dimensionless form. An approximation of the theoretical current vs. distance behavior for the DC signal is given by equation 3.

$$i_{T,DC}/i_{T,\infty} = 1/(0.15 + 1.5385/L + 0.58\exp(-1.14/L) + 0.0908\exp[(L-6.3)/1.017L]) \quad (3)$$

Equation 4, the predicted TPM response, is the derivative of equation 3.

$$d(i_{T,DC}/i_{t,\infty})/dL = (1.5385 - 0.6612\exp(-1.14/L) - \quad (4)$$

$$0.56249\exp[(L - 6.3)/1.017L])/\{(0.15 + 1.5385/L + 0.58\exp(-1.14/L) + 0.0908\exp[(L - 6.3)/1.017L])L\}^2$$

Equation 3 was used to fit the experimental data to estimate $i_{T,\infty}$ and $d'$. Note that equation 3 is only strictly valid for an SECM tip with an embedded disk geometry such that the ratio of the radius of the insulating sheath around the electrode to the electrode itself is 10. The DC SECM insulator response is sensitive to this ratio (RG) and larger ratios decrease the tip current. (7). In contrast, the DC SECM conductor response is insensitive to the RG value.

The DC data shown in FIG. 4B fit equation 3 quite well, although two of the experimental current-distance curves are for an electrode with an RG value of about 5 ($a' = 1.0$ $\mu$m). The use of equation 3 to fit these data will cause the absolute tip-substrate separation calculated from these data to be too large by about 0.2 $d'/a'$ units. (7). Despite this error, the general agreement between the theory and DC experiment is good. However, the derivative of the DC current does not agree with the TPM data, FIG. 4A. The curves from a tip with $a' = 1$ $\mu$m and RG = 5 are different from the curves for a tip with $a' = 4$ $\mu$m and RG = 10, and both curves show a much larger response than that predicted from equation 4.

The good agreement for the TPM signal and the DC derivative at the conductor substrate, as well as the poor agreement at the insulator substrate, reflect the different nature of the DC SECM feedback signal from these two types of surface. At a conductor, the feedback signal is predominantly due to the recycling of the mediator in the tip-substrate gap. This leads to an approximately linear concentration gradient between the tip and substrate. At an insulator, the SECM feedback current decreases because of physical blockage of the diffusion path of the mediator molecule by the presence of the insulating surface. As such, the signal is strongly dependent on the geometry of the tip, particularly the ratio RG. As a result, the concentration gradient between the tip and substrate is not linear and it extends out from the tip electrode to the edge of the tip insulator (7). Because of the extended diffusional field and the restricted geometry, the time for the DC SECM insulator response to reach a steady state is much longer than that for the conductor response (10-11); this is a possible reason for the difference in the response. The TPM current vs. distance curves in FIG. 4A are independent of $f_m$ over the range of 40 to 150 Hz. This suggests that lower frequencies would be required to reach steady state.

The larger TPA insulator response is probably not seriously affected by convection effects. In effect, the tip modulation can act as a tiny pump to replenish the solution in the tip-substrate gap. Although there is no direct evidence against this, two factors suggest that convective effects are minimal. First, in FIG. 4A the modulation amplitude was varied by factors of 2.5 and 10 for the two electrodes used. However, the response after scaling for the modulation amplitude was not changed.

The second factor concerns the different response when the electrode RG value was varied. The response for the electrode with RG = 5 was smaller than that for the RG = 10 electrode. Theory predicts that smaller RG values lead to quicker settling to steady state, and thus AC signals from tips with smaller RG values should be closer to the current predicted by equation 4.

Although, the TPM SECM signal at insulators cannot, as yet, be described theoretically, the deviations from predicted behavior lead to significant improvements in sensitivity. Moreover, the magnitude of the TPM signal increases with decreasing tip-substrate distance from a zero baseline, while the DC signal decreases; this improves both sensitivity and precision. Finally, the TPM signals at insulators and conductors are of different sign (bipolar), as opposed to the unipolar signal with DC SECM, thus providing unambiguous detection of the state of the substrate surface.

Example 2

Imaging with the TPM SECM

Line Scans

Figure 5A:
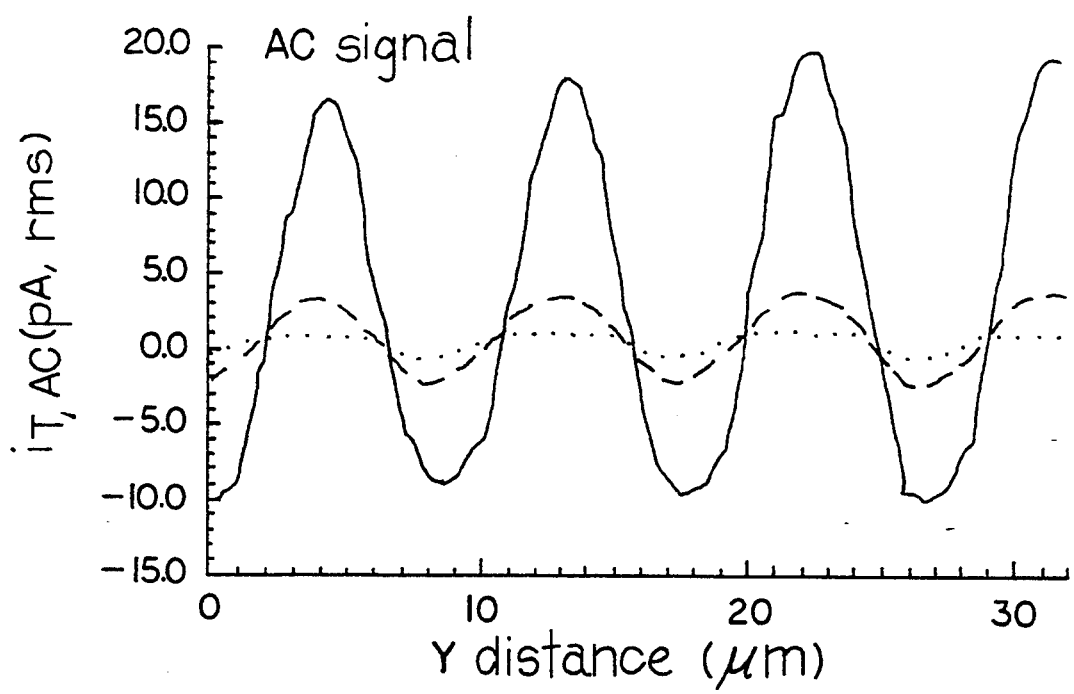
FIG. 5A Line scans at various distances with TPM SECM in-phase current at the IDA electrode.
Figure 5B:
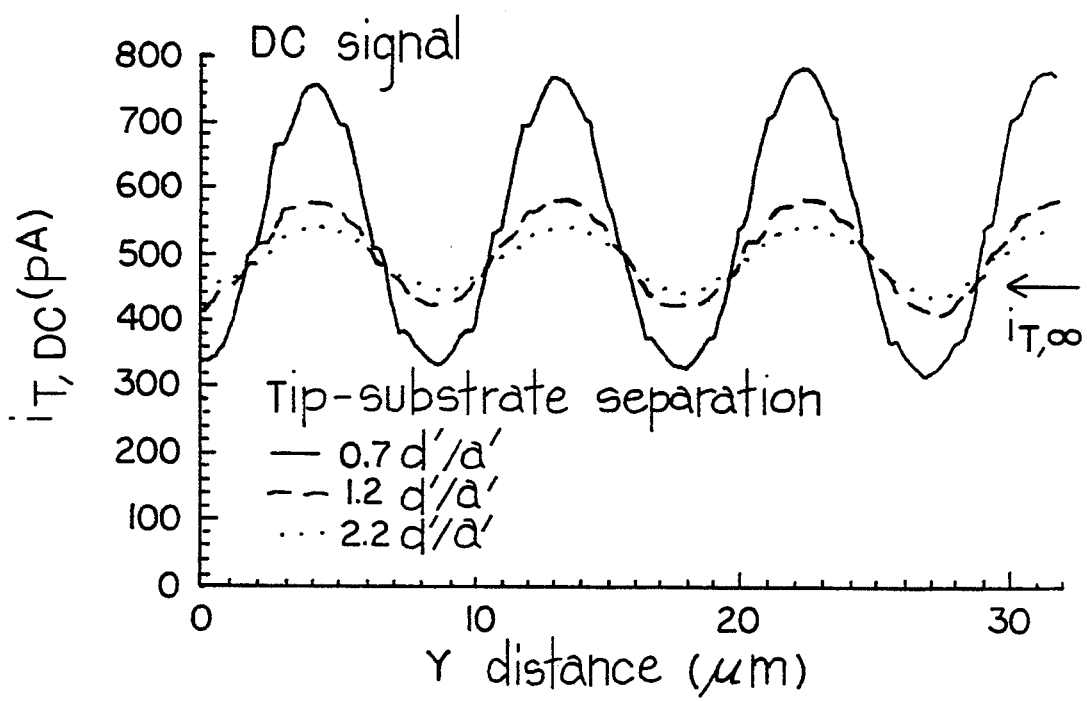
FIG. 5B Line scans at various distances with SECM in-phase current at the IDA electrode.

FIG. 5 shows several line scans over the surface of an interdigitated array (IDA) electrode at different tip-substrate distances. These data are acquired under conditions similar to those in FIGS. 3 and 4 and show the TPM and DC responses as the tip is scanned parallel to the surface of the IDA electrode. The IDA consists of 3-$\mu$m wide bands of Pt spaced by 5 $\mu$m of $SiO_2$ and so presents alternately conducting and insulating behavior as the tip is scanned across the surface in a direction nearly perpendicular to the band's long axis. Note that with the 1 $\mu$m tip used here, the scan resolution causes the observed band structure to be somewhat rounded. As expected, the TPM response of the line scan is bipolar and rapidly falls off with increasing distance.

This contrasts with the DC signal, which is present on top of the $i_{T,\infty}$ level and decreases more gradually. Another important distinction is the increased sensitivity of TPM in the insulator region. This is especially noticeable at larger tip-substrate separations when the DC insulator signal is nearly swamped by the larger conductor signal.

Notwithstanding the noted differences, however, the problem of imaging insulating regions adjacent to conducting regions is common to both in-phase TPM and DC SECM. Even when the tip is completely over the insulator, the mediator species can provide some positive feedback by diffusion from the disk to the conductor edge, making the observed insulator response more positive and obscuring insulator features. The application of image processing techniques, which decrease diffusional effects on SECM images (12), can enhance TPM SECM images in such circumstances.

Surface Images

Figures 6A, 6B, 6C:
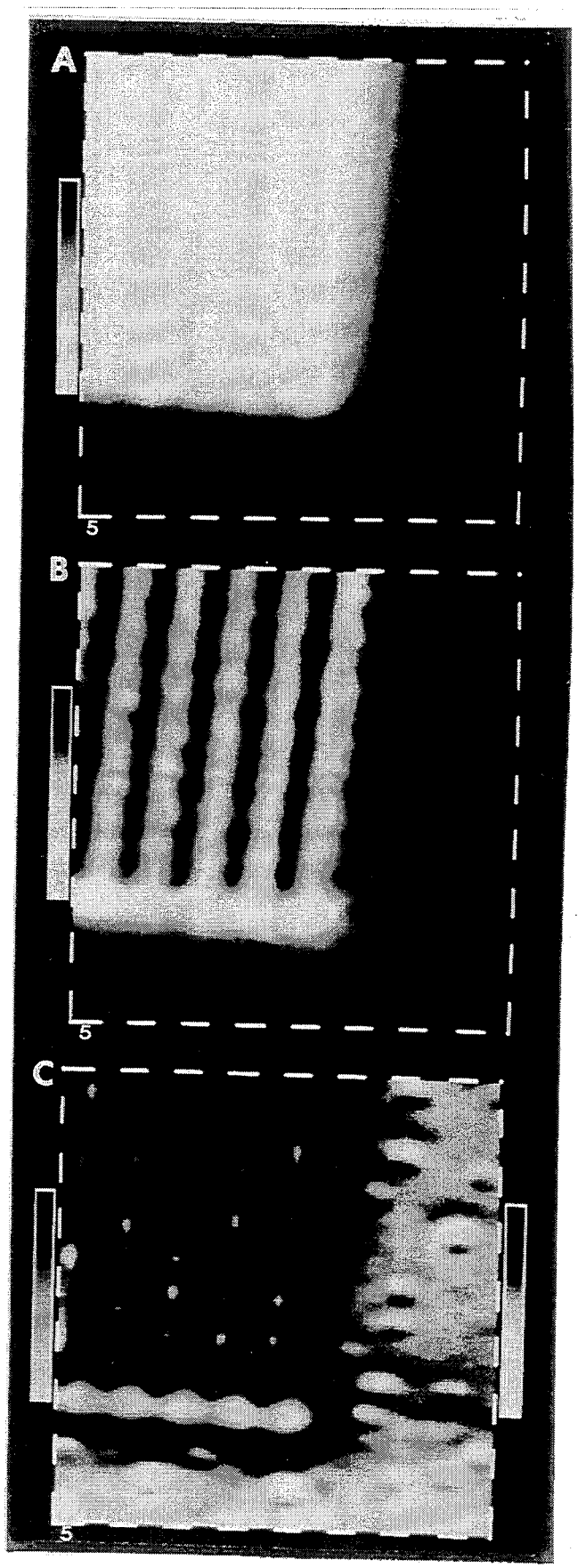
FIG. 6A SECM image of $80 \times 80$ μm portion of IDA substrate, scale is 200 to 850 pA, $i_{T,\infty} = 470$ pA.
FIG. 6B TPM SECM image, scale is $-7$ to 15 pA$_{rms}$.
FIG. 6C Absolute value TPM SECM image, left scale $=0$ to 15; right scale $=0$ to 7 pA$_{rms}$.

Images of a portion of the IDA electrode acquired with DC and TPM SECM are shown in FIG. 6. The band structures observed in the upper left of the image are the Pt bands, with the remainder of the image being the insulating $SiO_2$ substrate. FIG. 6A is the image acquired with the DC signal, while FIGS. 6B and 6C are TPM images. Here the images acquired with the TPM signal are significantly more detailed than the DC image. In particular, note the improved detail in the insulating region of the image, due to the better sensitivity of the TPM signal at insulators. FIGS. 6A and 6B are plotted as grey scale, with more positive current shown as a lighter shade. However, this representation is somewhat confusing, since the insulating signal is presented with the darkest portions representing protrusions. Thus, the apparent crater-like features seen in the TPM image are actually bumps. The DC image shows the same dark spots, although they are more difficult to see due to the poorer insulating sensitivity. A more faithful representation of the image topography can be made by using the absolute value of the TPM in-phase current with separate gray or color scales for the insulating and conducting regions, as is shown in FIG. 6C. The features in the insulating region are now conventionally shown and are probably small dust particles on the surface of the substrate.

The enhanced distance sensitivity of the TPM signal is seen by the large currents observed at the tips of the conducting bands. The ends of the bands evidently protrude slightly above the rest of the band causing an increased signal in the DC image but an even greater signal increase with the TPM image. Thus, the apparent topographic image will be distorted by the nonlinearity of in-phase TPM current, and due care must be taken in the interpretation of such features. Alternatively, one can use a calibration curve to convert the TPM currents to actual distances. Note the advantage of SECM over optical microscopy in providing 3D (vs 2D) images.

Figures 7A, 7B, 7C:
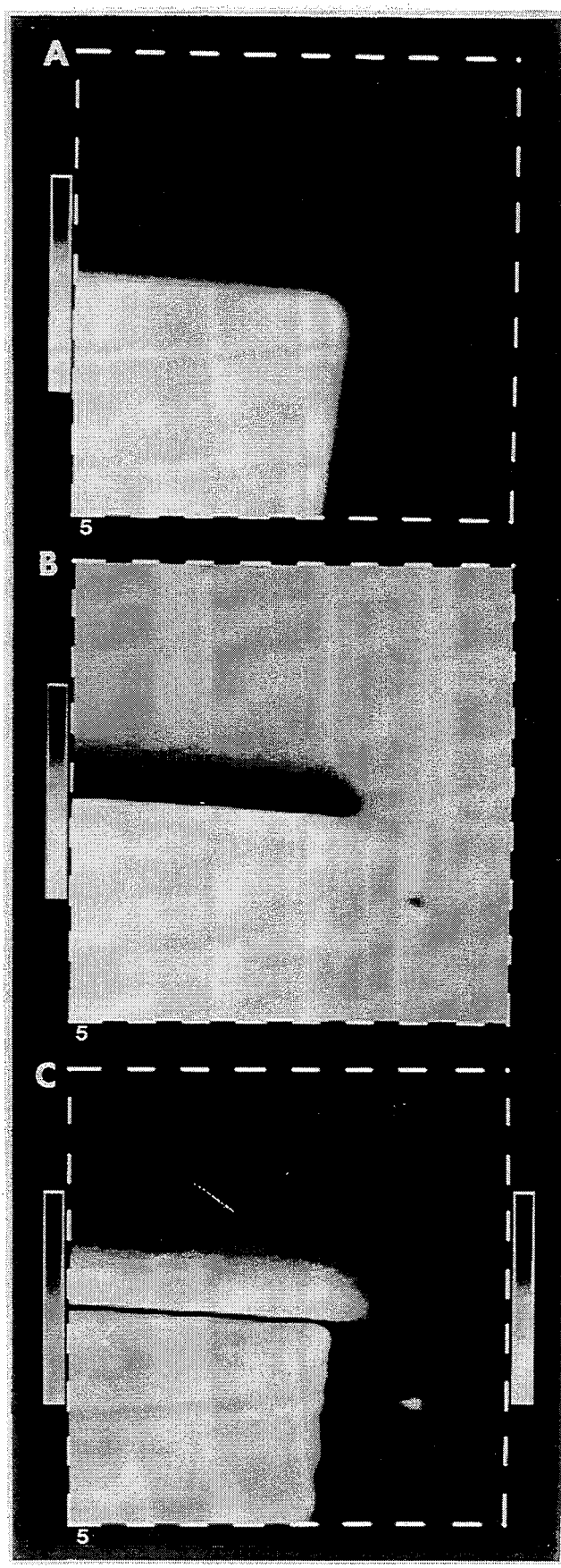
FIG. 7A SECM image of $80 \times 80$ μm portion of IDA substrate, scale is 250 to 850 pA, $i_{T,\infty} = 470$ pA.
FIG. 7B TPM SECM image, scale is $-15$ to 6 pA$_{rms}$.
FIG. 7C Absolute value TPM SECM image, left scale $=0$ to 6; right scale $=0$ to 15 pA$_{rms}$.

Another image of the IDA electrode is shown in FIG. 7. In this case the DC SECM and TPM SECM images show the corner of a rectangular Pt pad on the $SiO_2$ substrate. FIG. 7A is the image acquired with the DC signal while FIGS. 7B and 7C are AC images. Note the TPM images are significantly more detailed than the DC image (especially the raised insulator signal along the top edge of the Pt pad).

Constant Current Imaging at Mixed Insulator-Conductor Surfaces

The images in FIGS. 6 and 7 and, in fact, all previously published SECM images acquired in the feedback mode use constant-height scanning over the substrate surface. The term constant-height means that the tip is scanned over the substrate in a reference plane without attempt to control the tip-substrate distance. This method has the advantage of simplifying the scanning equipment but leads to a number of experimental difficulties. The major problem is that the tip will eventually crash into the surface, particularly if the surface is rough or sloped with respect to the scanning plane. Crashes are likely because the tip-substrate distance must be held within a few tip radii to provide an adequate feedback signal for imaging, and small tip radii are preferred because the lateral resolution of the SECM is governed by the size of the scanning tip. For practical reasons, it is difficult to use constant-height imaging with SECM tips smaller than about 1 micrometer.

This difficulty can be solved by imaging in a constant current mode, in which the tip current is used in a closed-loop feedback controller. By adjusting a fine vertical positioner so that tip current is maintained at a predetermined constant reference value measurably different from $i_{T,\infty}$ as the tip scans, the tip can be held at a constant tip-substrate distance; this reduces the likelihood of a tip crash.

The vertical positioner is typically a piezo-electric device and so the voltage applied to the piezo provides an imaging signal. This type of imaging is often used in other types of scanned probe microscopies, especially the STM (10). However, there is a particular difficulty in using the constant-current mode with the SECM. Over a conductor, the tip current is larger than $i_{T,\infty}$ and decreases with increasing tip-substrate distance, whereas over an insulator the tip current is less than $i_{T,\infty}$ and increases with increasing tip-substrate distance. This implies that to accurately image a mixed insulating-conducting surface in a constant-current mode the state of the surface under the tip must be known a priori.

The need for such a priori knowledge is obviated in the present invention, however, because the TPM in-phase or $\Theta_i$ signal supplies the needed information. In-phase signals have been used in combination with DC tip current in the construction of a closed-loop piezo-electric feedback control circuit (FIG. 8) to scan the tip in a constant current mode over a mixed insulator-conductor surface. Over a conductor, the DC tip current is maintained, through feedback control of the tip height, at a constant current larger than $i_{T,\infty}$. However, as the tip scans over an insulating region, the polarity change in $\Theta_i$ or the in-phase signal acts as a switch control to invert the direction of the feedback control signal so that the tip current can be maintained at a second control current. The use of two control currents is essential, because the DC current over an insulator is never higher than $i_{T,\infty}$ and the DC current over a conductor is larger than $i_{T,\infty}$.

Example 3
Phase Images

Figure 8:
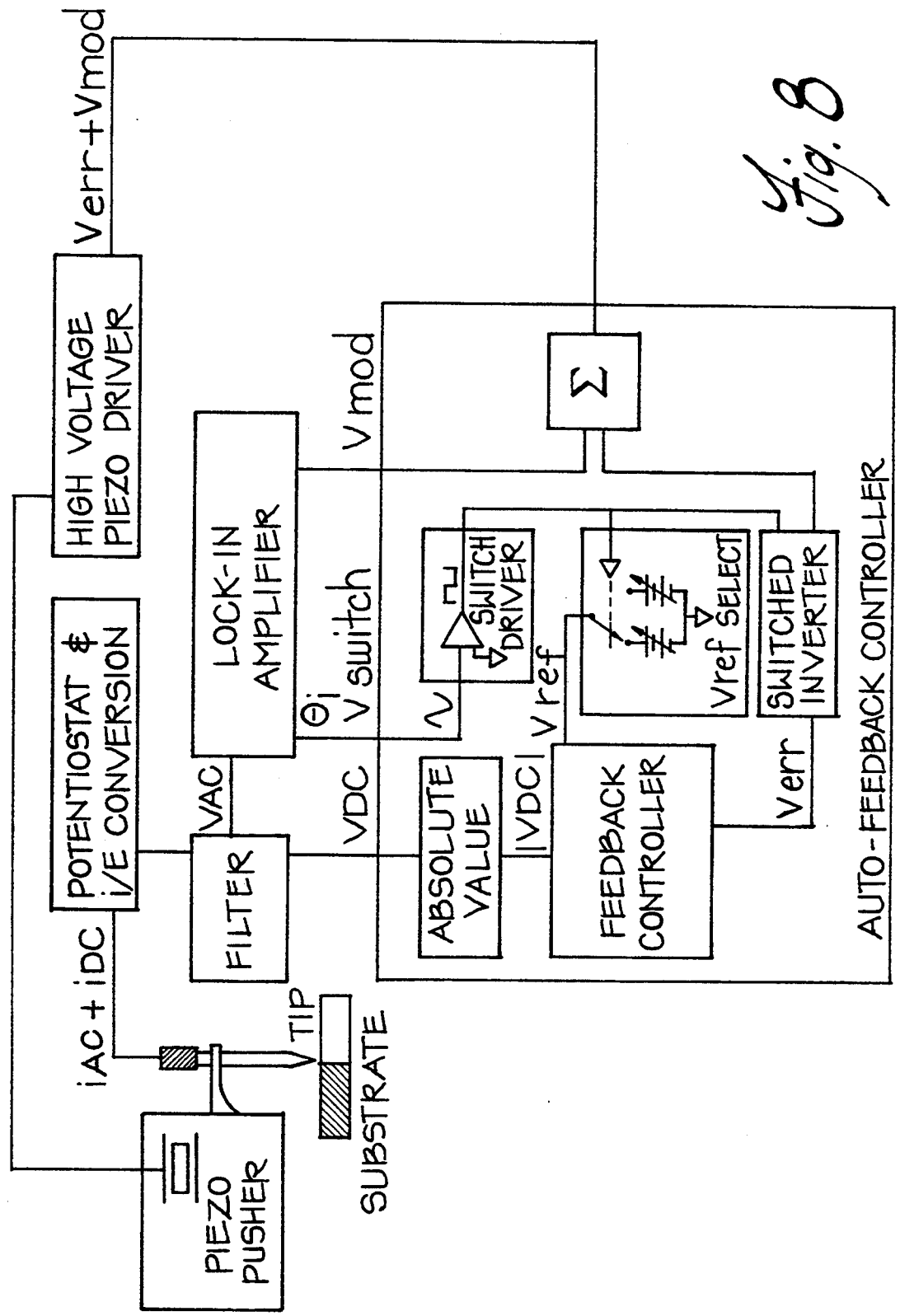
FIG. 8 Block diagram of a closed-loop piezo-electric feedback tip controller
Figure 9A:
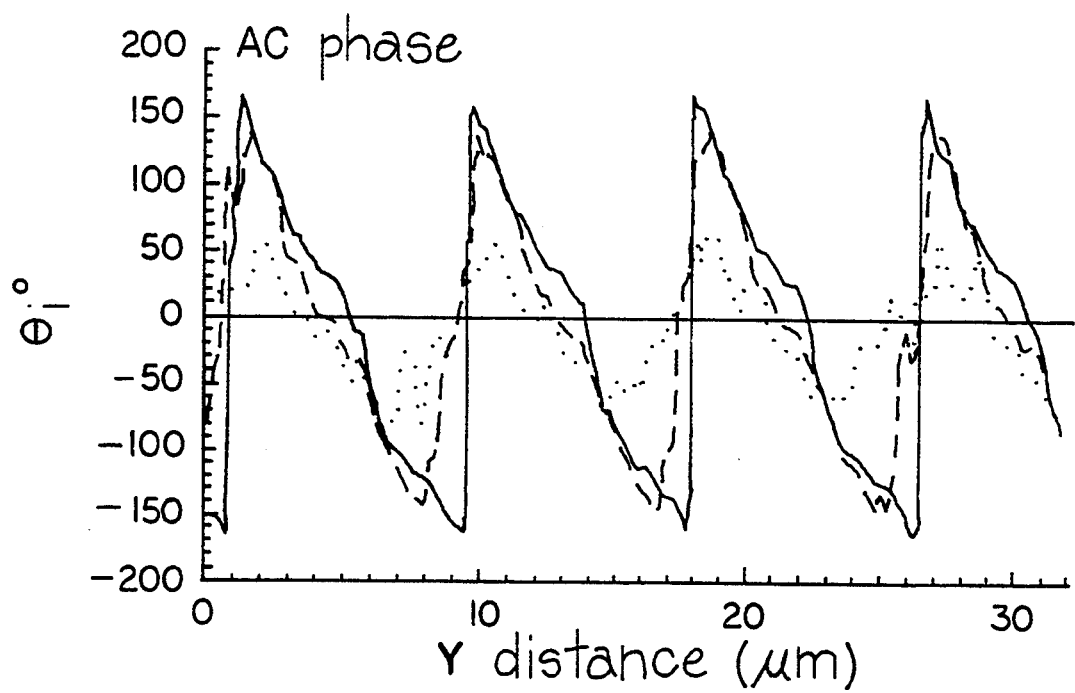
FIG. 9A Line scans at various distances with TPM SECM response current phase $\Theta_i$ at the IDA electrode.
Figure 9B:
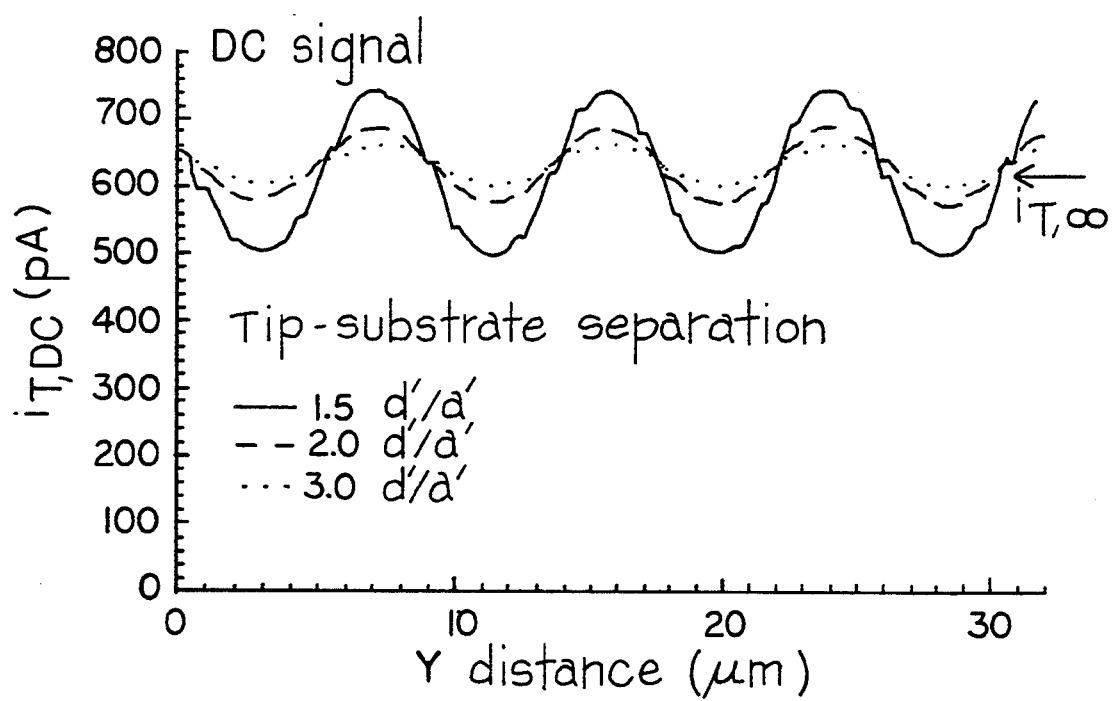
FIG. 9B Line scans at various distances with DC SECM response current at the IDA electrode.

The two channel lock-in amplifier used for this work can provide other imaging signals in addition to the in-phase current used above. A useful signal is the phase of the modulated current, $\Theta_i$. FIG. 8 shows the DC signal and $\Theta_i$ for line scans at different distances over the IDA electrode. The shape of the $\Theta_i$ signal shown is unusual and requires some explanation.

As expected from the in-phase results, the insulator and conductor responses are 180° out of phase. For these data the lock-in amplifier phase was arbitrarily advanced by 90° so that the conductor signal was maximized at −90° and the insulator signal maximized at +90°. Note that the signal is not inverted here as it is for the in-phase data. An unfortunate aspect of the $\Theta_i$ signal is that instead of $\Theta_i$ smoothly varying from +90° to −90°, the lock-in amplifier has a discontinuity at ±180°. Despite this, the $\Theta_i$ signal has the interesting property of being relatively insensitive to the tip-substrate separation. The effect of larger separations is to decrease the signal-to-noise of the response, rather than the magnitude. Thus, $\Theta_i$ is insensitive to sample topography but is sensitive to the substrate conductivity, whereas the DC and in-phase TPM response are sensitive to both. This property would be useful for applications in which the state of the surface must be distinguished, e.g., in the construction of a closed-loop piezo feedback control circuit to scan the tip in a constant current mode over a mixed insulator-conductor surface.

Example 4
TPM SECM to Examine Substrate Reaction Rates

The DC SECM signal can be used to examine substrate-mediator reaction rates (i.e., reaction rate imaging), especially for heterogeneous electron transfer (ET) between a conductive substrate and mediator (4–5) and for enzyme activity of biological samples (1).

Figure 10A:
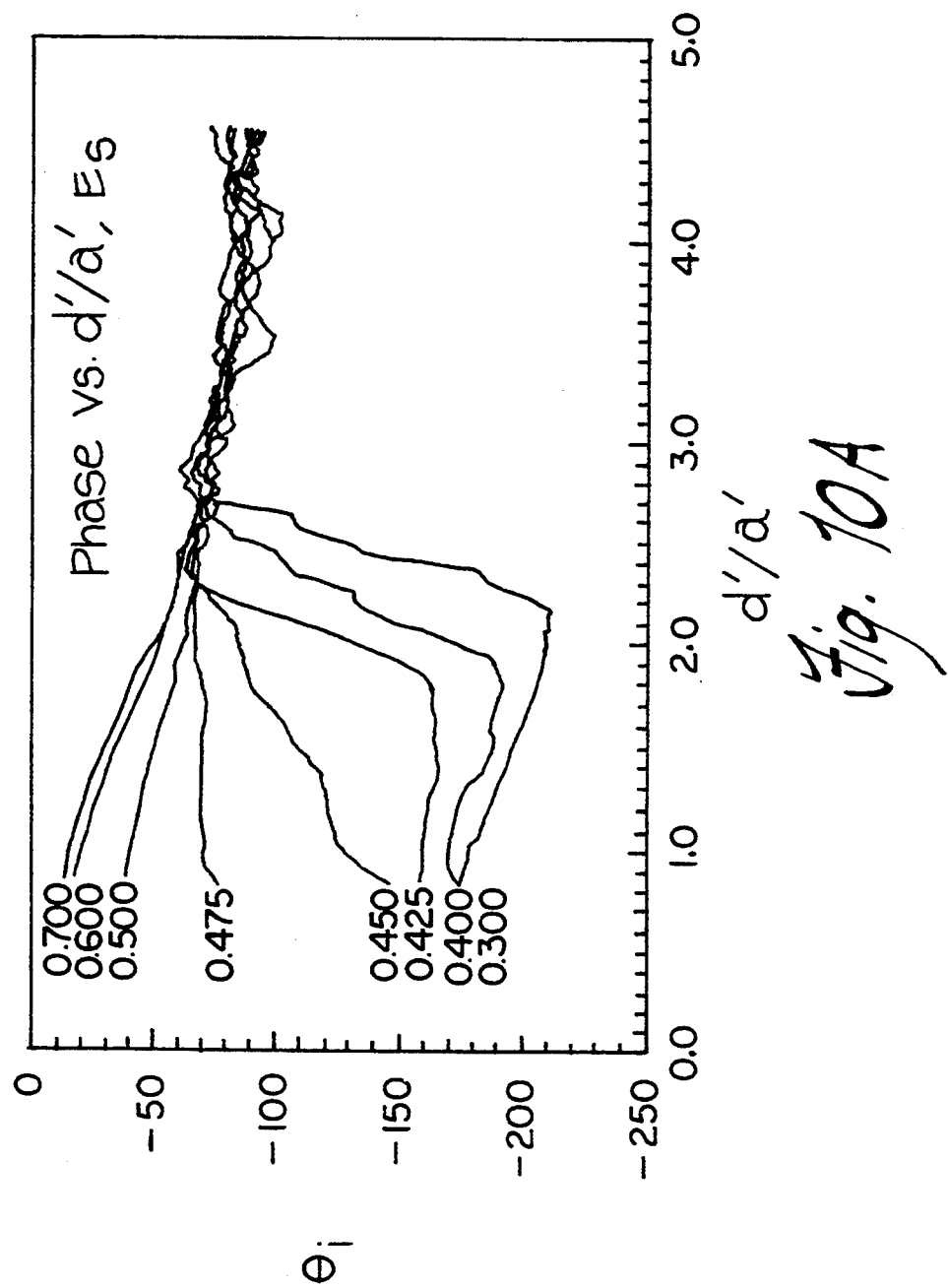
FIG. 10A TPM AC signal phase angle vs. $d'/a'$ at various values of substrate potential (labels $=E_s-E^{o'}$).
Figure 10B:
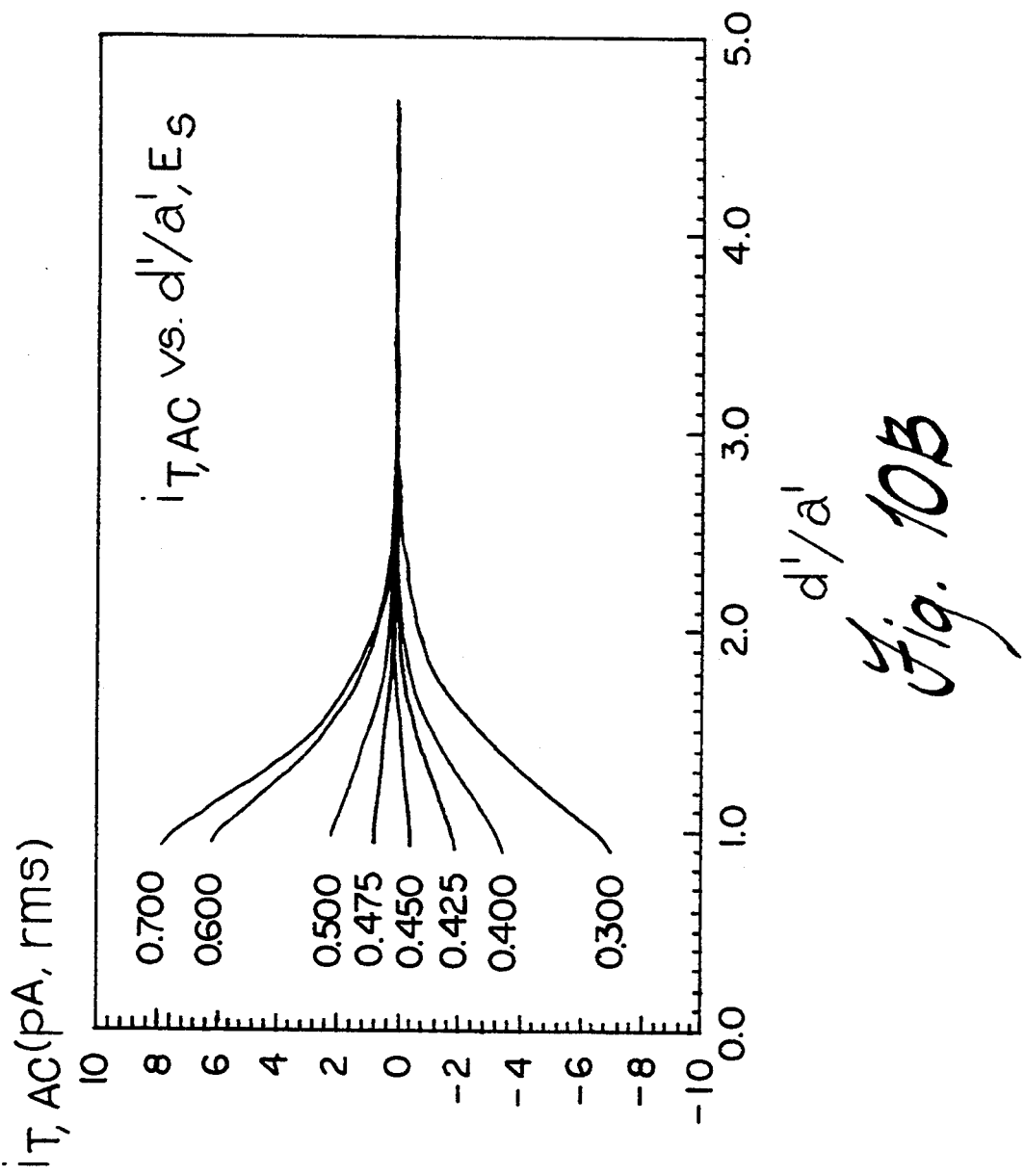
FIG. 10B In-phase TPM current vs. $d'/a'$ at various values of substrate potential (labels $=E_s-E^{o'}$).
Figure 10C:
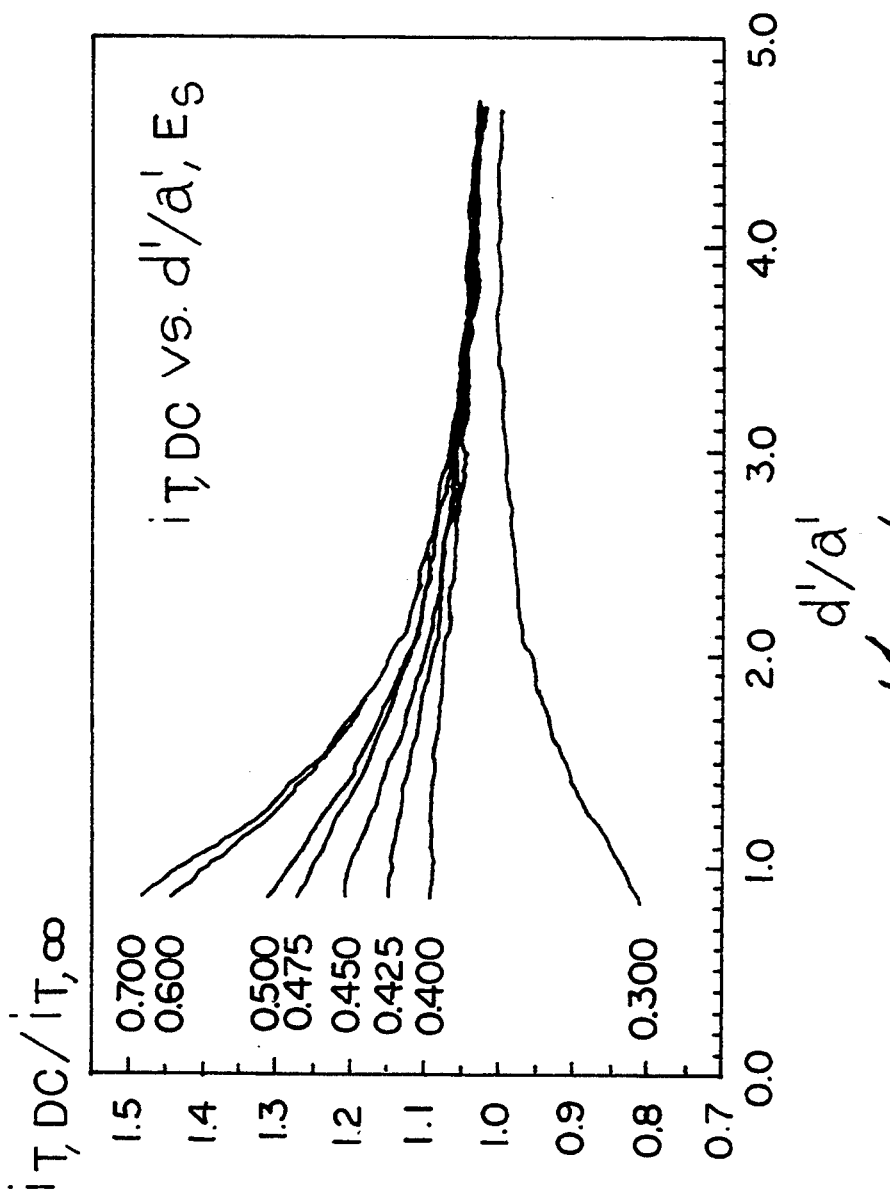
FIG. 10C DC current vs. $d'/a'$ at various values of substrate potential (labels $=E_s-E^{o'}$).

The ability of the TPM SECM to examine substrate activity is examined in the current distance curves of FIGS. 10A–C. These experiments use a 2 μm diameter Pt tip at a GC substrate. The TPM curves (FIGS. 10A–B) are for $f_m = 100$ Hz, and $\delta/a' = 0.1$. The mediator is 2 mM Fe(III) ion in a 1M $H_2SO_4$ solution. For DC SECM under these conditions, the heterogeneous rate of ET, $k_f$, from the GC substrate to the reduced mediator (i.e., Fe(II)) can be controlled precisely by controlling the substrate potential, $E_s$ (5). This then is a model system for examining substrate activity. The relations between $k_f$ and $E_s$ is given by the Butler-Volmer equation.

$$k_f = k^0 \exp[-\alpha nf(E_s - E^{o'})]$$

where $k^o$ is the standard rate constant, $E^{o'}$ is the formal potential, $\alpha$ is the transfer coefficient, n is the number of electrons and f is F/RT where F is the Faraday, R is the gas constant and T is the absolute temperature.

FIG. 10C shows DC current-distance curves for various values of $E_s-E^{o'}$ (labels indicate $E_s-E^{o'}$ in volts). At large positive $E_s$ (0.7 V), the substrate-mediator reaction rate is nearly diffusion limited and the curve is identical to that seen at a conductive sample. At less positive $E_s$ (0.3 V) the curves show negative feedback similar to that seen at an insulating sample. This is due to the extremely slow ET rate at this potential. At intermediate $E_s$ the curves show a transition between these two extremes as $k_f$ changes from fast to slow. It is in this intermediate region that $k_f$ can be determined by examining the current-distance behavior.

In-phase TPM current-distance curves acquired under identical conditions as in FIG. 10C are shown in FIG. 10B. The two extremes of insulating and conducting behavior are seen in the curves for 0.3 V and 0.7 V respectively, as expected from the DC results. At intermediate $E_s$ values, the curves show intermediate behavior between the extremes. Note the improved signal with respect to the DC response. The lack of a large DC offset in the TPM response improves the sensitivity of the signal to substrate activity. The phase of the AC signal, $\Theta_i$, with $E_s$ is shown in FIG. 10A. At the two extremes of $E_s$, $\Theta_i$ is 180° separated, indicating insulating and conducting behavior. The phase shift with $E_s$ shows the ability to distinguish substrates with intermediate properties between purely conducting and insulating behavior. $\Theta_i$ also shows a slight distance dependence out to about two disk radii. This is likely due to the phase shift introduced by the diffusion time of the mediator. At greater distances $\Theta_i$ converges to about 90°, indicating that the AC signal is now no longer sensing the substrate surface. This is predicted from the in-phase current of FIG. 10B, which vanishes at $d'/a' > 3$.

REFERENCES

The citations in the following list are incorporated in pertinent part herein for the reasons cited in the text.
1. Bard, et al. (1991) Science, 254:68–74.
2. Bard, et al. (1990) Acc. Chem. Res., 23:357–363.
3. Engstrom, et al. (1989) Anal. Chem., 61(19):1099A–1104A.
4. Wipf, et al. (1991) J. Electrochem. Soc., 138(5):L4–L6.
5. Wipf, et al. (1991) J. Electrochem. Soc., 138(2):469–474.
6. Lee, et al. (1991) Anal. Chem., 63:78–83.
7. Kwak, et al. (1989) Anal. Chem., 61:1221–1227.
8. Hieftje, G. M. (1972) Anal. Chem., 44(6):81A–88A.
9. Kwak, et al. (1989) Anal. Chem., 61:1794–1799.
10. Bard, et al. (1991) Anal. Chem., 63:1282–1288.
11. Unwin, et al. (1991) J. Phys. Chem., 95:7814–7824.
12. Lee, et al. (1991) Anal. Chem., 63:2442–2447.
13. Binnig, et al. (1982) Helv. Phys. Acta, 55:726–735.
14. Pashley, et al. (1985) Surf. Sci., 152/153: 27–32.
15. Binnig, et al. (1983) Surf. Sci., 126:236–244.

Changes may be made in the construction, operation and arrangement of the various parts, elements, steps and procedures described herein without departing from the concept and scope of the invention as defined in the following claims.

What is claimed is:

1. A method for characterizing a substrate surface, the method comprising
    establishing an electrical potential between a reference electrode and an ultramicroelectrode, the ultramicroelectrode being separated by a distance from a substrate surface and in communication with the surface through an electrolyte solution comprising a mediator; and measuring electrical current changes in the ultramicroelectrode as a function of continuous or discrete variations in the distance separating the ultramicroelectrode from the surface as the ultramicroelectrode is scanned over the surface;

wherein the current is faradaic, decreasing with increasing distance when the surface is a conductor and increasing with increasing distance when the surface is a insulator.

2. The method of claim 1 wherein the substrate surface comprises a conducting area and further comprising the step of establishing an electrical substrate potential between a conducting substrate and the reference electrode, wherein the substrate potential is sufficiently positive with respect to the mediator redox potential so that a substrate reaction at the tip is diffusion limited.

3. The method of claim 1 wherein the distance separating the ultramicroelectrode from the surface is varied sinusoidally at frequency $f_m$ to produce simple harmonic motion of the ultramicroelectrode with respect to the surface and an alternating current of frequency $f_m$ in the ultramicroelectrode.

4. The method of claim 3 wherein the simple harmonic motion has a frequency between about 20 Hz and about 20,000 Hz.

5. The method of claim 1 wherein the distance separating the ultramicroelectrode from the surface is varied discretely.

6. The method of claim 1 wherein the ultramicroelectrode has a conductor radius $a'$ of between about 0.005 and 12.5 μm.

7. The method of claim 6 wherein the ultramicroelectrode moves in simple harmonic motion through distance $\delta$ perpendicular to the surface at a distance of about $d'$ from the surface;

wherein $d' >$ about $2.5\delta$; and wherein $\delta/a'$ is between about 0.01 and 1.0.

8. The method of claim 1 wherein the mediator is $Ru(NH_3)_6Cl_3$, $Fe(CN)_6^{3-}$, $Fe_2(SO_4)_3$, or methyl viologen dication.

9. The method of claim 1 wherein the mediator is at a concentration from about 0.1 mM to about 2.0M.

* * * * *